Figures 1, 2:
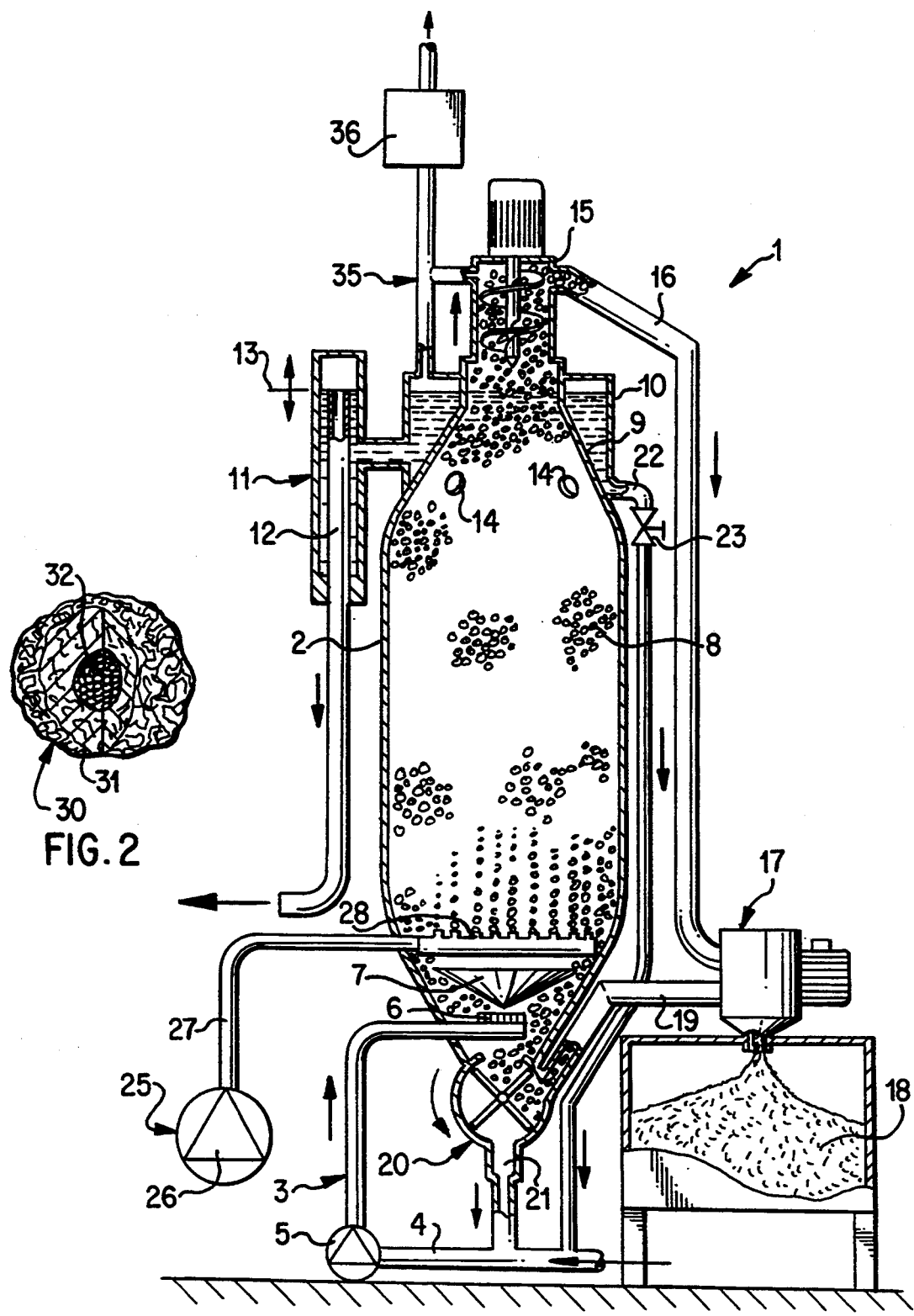

United States Patent [19]
Van Der Herberg

[11] Patent Number: 5,429,740
[45] Date of Patent: Jul. 4, 1995

[54] DEVICE FOR THE PURIFICATION OF WASTE WATER

[76] Inventor: Jan W. Van Der Herberg, No. 28, De Wiekslag, NL-8446 KT Heerenveen, Netherlands

[21] Appl. No.: 170,335
[22] PCT Filed: Jul. 2, 1992
[86] PCT No.: PCT/NL92/00119
§ 371 Date: Dec. 30, 1993
§ 102(e) Date: Dec. 30, 1993
[87] PCT Pub. No.: WO93/01137
PCT Pub. Date: Jan. 21, 1993

[30] Foreign Application Priority Data
Jul. 3, 1991 [BE] Belgium .................... 9100636

[51] Int. Cl.$^6$ .................................. C02F 3/06
[52] U.S. Cl. ..................... 210/151; 210/195.1; 210/618
[58] Field of Search ............ 210/150, 151, 188, 194, 210/195.3, 195.1, 257.1, 259, 618

[56] References Cited

U.S. PATENT DOCUMENTS

| | | | |
|---|---|---|---|
| 4,545,909 | 10/1985 | Atkinson et al. | 210/618 |
| 4,612,115 | 9/1986 | Titoff | 210/618 |
| 4,681,685 | 7/1987 | Sutton et al. | 210/618 |
| 4,940,546 | 7/1990 | Vogelpohl et al. | 210/151 |
| 5,019,268 | 5/1991 | Rogalla | 210/151 |

FOREIGN PATENT DOCUMENTS

| | | |
|---|---|---|
| 0208253 | 1/1987 | European Pat. Off. |
| 0356870 | 3/1990 | European Pat. Off. |
| 2538800 | 7/1984 | France |
| 2626868 | 8/1989 | France |
| 60-28559 | 7/1985 | Japan |
| 62-79896 | 4/1987 | Japan |
| 2139095 | 5/1990 | Japan |
| 3249992 | 11/1991 | Japan |

OTHER PUBLICATIONS

Patent Abstracts of Japan, vol. 10, No. 56 (C-331) (2113), Mar. 6, 1986, & JP-A-60 197 295, (Denka Engineering), Oct. 5, 1985.
Patent Abstracts of Japan, vol. 6, No. 3, (C-86) (881), Jan. 9, 1982, & JP-A-56 129 087, (Kubota Tekko K.K.), Oct. 8, 1981.

*Primary Examiner*—Christopher Upton
*Attorney, Agent, or Firm*—Evenson, McKeown, Edwards & Lenahan

[57] ABSTRACT

The invention relates to a device for purifying waste water, comprising a reservoir (2), supply means (3) for the waste water flowing out into the reservoir, means for maintaining a pre-determined fluid level (11) in the upper part of the reservoir and draining means (12) for draining purified water from the reservoir. Said reservoir forms part of a cycle of microbe supporting elements (8) that have a lower density than 1, and comprising means (15) for removing microbe supporting elements from the reservoir operative above the pre-determined level, cleaning means (17) for removing sludge from the supporting elements, and re-introducing means (20) flowing out into the lower part of the reservoir for re-introducing the cleaned microbe supporting elements.

20 Claims, 1 Drawing Sheet

DEVICE FOR THE PURIFICATION OF WASTE WATER

The invention relates to a device for purifying waste water, in particular for removing organic waste material therefrom through biological fermentation, as known from EP-A-0 356 870.

The device according to the invention comprises a reservoir, supply means for the waste water flowing out into the reservoir, means for maintaining a pre-determined fluid level in the upper portion of the reservoir, means for draining off purified water from the reservoir, said reservoir forming part of a cycle of microbe supporting elements having a density lower than 1, comprising elements operative above the pro-determined level for removing the microbe supporting elements from the reservoir, cleaning means for removing sludge from the supporting elements, and re-introducing means flowing out near the bottom of the reservoir for the cleaned microbe supporting elements.

Microbe cultures grow on the microbe supporting elements that decompose the organic waste matter. After the microbe supporting elements have remained in the reservoir for a certain period of time the supporting elements are covered with decomposition products in the form of sludge. Because the supporting elements have a lower density than 1 these will be pushed up to the top of the reservoir above the pre-determined fluid level by the supporting elements underneath in the fluid. Before the supporting elements are taken out of the reservoir these will be out of the fluid for some time and the adhering fluid will drip down. The relatively dry microbe supporting elements will then be taken out of the reservoir and the sludge will be removed therefrom in the cleaning means. Hence the released sludge has a relatively low water content and can be transported off in an economic way. After having passed the cleaning means the microbe supporting elements will for the most part be without any sludge but will still carry a large quantity of microbes. As soon as the supporting elements have been fed back into the reservoir, they can become immediately active.

For a correct guiding of the microbe supporting elements in the upper part of the reservoir preferably the measure of claim 2 is adopted.

A favourable further development of the device according to the invention is characterized in claim 3. While the microbe supporting elements stay in the reservoir, the purified water enters the toptank through the holes. The purified water is removed from the toptank.

Herewith preferably the measure of claim 4 is adopted. If along with the purified water coming out of the reservoir into the toptank loose sludge particles are carried along, these will deposit in the toptank. By regularly opening the valve in the sludge outlet the deposited sludge is removed from the toptank and again brought into the lower part of the reservoir along with the waste water. Accordingly it is ensured that the drained off purified water is sufficiently free from loose particles.

In order to take care that the microbe supporting elements remain relatively dry in the cycle between the removing means and re-introducing means, so that the sludge may be carried off relatively dry, the measure of claim 5 is adopted. Any water possibly released from the sluice can be simply led back into the waste water supply means.

Because of the lifting power of the microbe supporting elements these will automatically "flow" out of the top of the reservoir. In order to control the duration of stay of the microbe supporting elements for an optimum working of the device according to the invention preferably the measure of claim 6 is adopted.

The device is in particular suited for an aerobe purification process. For that purpose the measure of claim 7 is adopted. An extra advantage is that because of the air brought in air bubbles will adhere to particle-shaped organic waste matter, which will cause these particles to quickly rise to the pre-determined level in the reservoir. There these particles will be carried off by the upward flow of microbe supporting elements and will be directly separated in the cleaning means. Thus a part of the solid particles will not burden the biological purification process, so that the total purification capacity of the device can be rather high.

The surplus of air blown in and the gaseous waste products formed during the purification process will gather in the space above the pre-determined level. With the measure of claim 8 this gaseous material can be removed to a desired place.

Herewith preferably the measure of claim 9 is adopted. In the filtering means the harmful and otherwise undesired elements can be removed from the drained off gaseous material. A particular favourable embodiment of the device according to the invention is characterized in claim 10. By designing the microbe supporting elements as foamed synthetic grains, these will get a very large effective surface, so that in a confined space a large purification capacity can be reached. In particular with the measure of claim 11 a very large effective surface is obtained.

In the innermost part of the synthetic grains it will in general not be possible to have any effective microbe activity. By adopting the measure of claim 12 it is ensured that the synthetic grains have a low density and hence a good rising ability.

With the measure of claim 13 a relatively hard synthetic grain is obtained that can be well transported in the cycle.

The grains can be well manipulated, when the measure of claim 14 is adopted thereby.

With the device according to the invention it will be possible to achieve a very high capacity, with a certain (limited) size of the installation at a high efficiency. This makes the installation in particular suited for those industries that usually dump non-purified waste water directly into the surface water and/or the sewer system. In connection with the high environmental taxes connected therewith it will be economically feasible to purify the waste water before dumping it. The rather small size will make it in general possible for the device to be even utilized in businesses where one has to make the most of the space available, such as businesses that are situated in built-up areas. The measure of claim 15 is thereby rather favourable.

The device is in particular suited for use in the food industry and in particular in fish filleting businesses, chicken abattoirs, crustacean processing businesses and the like. In such businesses large waste water flows with organic pollution occur. The large effective surface presented by the grains hence attains a high cleaning capacity; the sludge is released with a low water content, so that this can be efficiently removed and there is only little power needed to recirculate the grains since the "drive" is obtained through the capacity to float of the grains itself. These two latter aspects cuase a relatively limited use of energy. Combined with the limited size of the device hence an economic system is obtained.

The invention will be further explained in the following description by means of the accompanying figures.

FIG. 1 schematically shows a device according to the invention.

FIG. 2 shows in a partially broken away perspective view a microbe supporting element for use in the device according to the invention.

The device 1 shown in FIG. 1 uses biological processes known in itself to remove organic pollution from waste water. Moreover, inorganic particles can be removed from the waste water in a manner further to be described.

The device 1 comprises mainly a reservoir 2, which as shown, is preferably a standing reservoir. At the bottom of this reservoir 1 polluted waste water is supplied through waste water supply means 3. The waste water supply means 3 contain a supply pipe 4, in which a pump 5 is fitted, which transports the supplied waste water to an outflow opening 6 in the reservoir. Above the outflow opening 6 a deflector plate 7 is fitted in order to equally distribute the supplied waste water over the cross-section of the reservoir 2.

In the reservoir a granular filling 8 has been included. The grains 8 form microbe supporting elements on the surface of which microbe cultures develop that decompose the organic pollution.

According to the invention the grains have a lower density than 1, so that these want to rise in the reservoir 2 filled with waste water.

The upper end 9 of the reservoir 2 is cone-shaped, so that the grains 8, pushed up by the floating power move upwards into the grain removing means fitted in the conical upper end 9 of the reservoir 2, which are in this example embodied as a metering screw 15.

Around the upper end 9 of the reservoir 2 a toptank 10 has been fitted that is connected to the inside of the reservoir 2 through holes 14 near the lower part of the toptank 10. After having passed the reservoir 2, the waste water flows through the holes 14 into the toptank 10 and from there the purified waste water is drained away through the drain pipe 12. In the drawn embodiment the drain pipe 12 can be slidably received in a standing pipe fixedly connected to the toptank 10. Accordingly level adjustment means 11 are formed. By sliding the drain pipe 12 vertically it will be possible to adjust the level 13 of the water in the toptank 10 and, on account of the open connection through the holes 14, in the reservoir 2.

By the bacteriological processes known in itself the organic pollution is converted by the microbe cultures on the surface of the grains 8 into decomposition products usually called sludge. This sludge adheres to the grains 8. When the waste water has flown through the reservoir 2 and has arrived in the toptank 10 near the holes 14, this has been mainly stripped of the organic pollution through the biological purification. The decomposition products adhere as sludge to the grains 8.

The floating ability of the granular filling 8 pushes the grains with adhering sludge up above the fluid level 13 in the reservoir 2 into the grains removal means 15. While moving towards these removal means or metering screw 15, the grains are for some time above the fluid. This makes the adhering water drip down, so that the grains with adhering sludge will be received into the metering screw 15 relatively dry. By adjusting the level 13 with the level adjusting means at the correct height, the time the grains are out of the fluid and hence the extent of drying of the grains is adjusted.

The grains taken out of the reservoir 2 with the metering screw are fed into a sludge separator 17 through the grain drain pipe 16. This sludge separator 17 is made up from means in itself known, such as for instance a centrifuge or shaking drum. The function of the sludge separator 17 is that the sludge is removed from the grains to a considerable degree. The sludge 18 is collected in a reservoir and the relatively clean grains are again fed into the reservoir 2 through a grain feeding pipe 19. Because of the drying time at the top of the reservoir 2 the separated sludge is relatively dry, so that this can be economically processed.

The relatively clean grains are again introduced into the lower part of the reservoir 2 through sluice 20. The working of the sludge separator 17 has for the greater part removed the sludge from the grains, but there are still large quantities of microbes on the grains, so that the grains newly brought into the reservoir 2 are immediately effective to decompose the organic pollution. The water 21 falling free by the operation of sluice 20 is brought back into the waste water supply pipe 4 and hence brought back into the reservoir.

With the purified waste water small sludge particles will arrive through the hole 14 into the toptank. These sludge particles will be deposited in the toptank 10 and be collected in the circular space with cuneiform sectional plane at the spot where the toptank 10 and the upper part 9 of the reservoir 2 meet. In order to periodically drain away the deposited sludge particles the lower part of the toptank 10 is connected to a sludge drain pipe 22. As FIG. 1 shows, this sludge drain pipe 22 leads to the waste water supply pipe 4. In the sludge drain pipe 22 a valve 23 is included that is periodically opened to drain away the sludge. The deposited sludge particles hence come into the waste water supply pipe 4 and return through the pump 5 into the reservoir, in which these adhere to the grains 8 or are removed thereby in the upper part of the reservoir 2 together with the grains.

The device 1 shown in FIG. 1 is designed to execute an aerobe purification process. For this purpose air is blown into the lower part of the reservoir 1 by means of air supply means 25. These air supply means contain a pump 26 that divides air equally across the sectional plane in the reservoir 2 through a pipe 27 and a distributor 28. Because of the supply of air the microbe-cultures developing will contain oxygen-loving microbes.

An additional favourable effect of the supplied air is that air bubbles will adhere to the solid particles brought into the reservoir with the waste water, which bubbles will have these solid particles pushed up into the upper part 9 of the reservoir. The solid particles will collect at the top of the reservoir in a flotation layer. The solid particles are taken along from there by the upmoving grains 8 into the removal means 15 and are again removed from the grains in the sludge separator 17.

The solid particles that are removed from the waste water through the effect described, are both organic and inorganic particles. Because the organic particles are in this way immediately removed from the waste water, the biological purification capacity of the device is mainly used for removal from the waste water of dissolved organic pollution.

The grains 8 can consist of any suitable material that has a lower specific gravity than 1 and that form a proper basis for the formation of the cultures of microorganisms. The grains can in particular consist of foamed synthetic grains of a material from the group polyolefines, such as polyethylene, polypropylene and the like, or mixtures thereof. The foam structure is preferably such that the outer part of every grain has open cells. This makes the effective surface of each grain extremely large. Such a grain 30 is shown in FIG. 2. The outer part 31 has the open cells mentioned before, whereas the inner part, which is indicated in the figure with 32, can have closed cells or can even be entirely hollow. The closed cells or cavity in the inner part 32 provides for a favourable low specific gravity of the grain. Said synthetic material provides for relatively hard grains. Hard grains have the advantage that they can be well led around in the cycle in the device of the present kind, without getting damaged or otherwise impeding on the good progress of the described working.

A gas drain 35 is connected at the top of the reservoir 2. The air blown in by means of the air supply means 25 is again drained off through this gas drain 35. Dependent on the composition of the waste water to be cleaned, it may be undesirable to directly drain off the gaseous reaction products formed into the environment. In that case a filter 36 is included in the gas drain means 35, which filters or in another way removes the elements undesirable for the environment from the drained gas. To clean the drained off gas techniques known per se are used.

The operation of the device is adapted to the composition of the waste water. Dependent on the duration required for decomposing the organic pollution, the circulation time of both the waste water and the grains 8 is set. The circulation time of the waste water naturally depends on the size of the device 1 and this device 1 will again have to be dimensioned for a specific situation. The circulation time of the grains is determined with the help of the operation of the grain removal means, in the example shown, the metering screw 15.

The entire device 1 can be suitably controlled by a programmable controlling device such as a PLC. From a basic set up the various parameters can be suitable adapted to the specific circumstances. For example in case of a changing composition of the waste water the programming can be adapted, in order to ensure an optimum operation.

The device according to the invention is in particular suited to be used in the food industry and in particular in fish filleting businesses, chicken abattoirs, crustacean processing businesses and the like. Large flows of waste water with organic pollution occur in such businesses. The application of the device according to the invention is, however, not limited to the food industry. It can also be advantageously applied in the textile industry.

The device has a large capacity in addition to a limited size because the grains have a large effective surface and the biological purification capacity is moreover only mainly used to decompose solved organic pollution. The particle-shaped pollution is removed from the waste water by flotation in the earlier-described manner. Through its limited size and because preferably a standing reservoir is used, in particular the limited necessary floor surface, the device can even in general be used in businesses where the most has to be made of the space available, such as businesses that are situated in built up areas.

Although in the described preferred embodiment the waste water flow direction is upward, also other flow patterns can be used. The waste water can flow downwardly or even a horizontal flow system might be possible.

I claim:

1. Device for purifying waste water, comprising a reservoir, supply means for the waste water flowing out into the reservoir, means for maintaining a pre-determined fluid level in the upper part of the reservoir, draining means for draining purified water from the reservoir, said reservoir forming part of a circuit of microbe supporting elements that have a lower density than 1, and comprising means for removing microbe supporting elements from the reservoir operative above the predetermined level, cleaning means for removing sludge from the supporting elements, and re-introducing means connected to the lower part of the reservoir for re-introducing the cleaned microbe supporting elements.

2. Device according to claim 1, wherein the means for removing the microbe supporting elements have been arranged at the top of the reservoir and the upper portion of the reservoir is evenly tapering towards the removing means.

3. Device according to claim 1, comprising a toptank arranged around the upper part of the reservoir, which is in open connection with the reservoir through holes in the wall of the reservoir, below the pre-determined level.

4. Device according to claim 3, wherein the toptank extends to a distance below the holes and is connected near the bottom thereof by a valve to a sludge drain pipe connected to the waste water supply means.

5. Device according to claim 1, wherein said re-introducing means comprise a sluice.

6. Device according to claim 1, said removing means comprising metering means for removing the microbe supporting elements in a metered amount.

7. Device according to claim 1, comprising air supply means flowing out into the lower part of the reservoir.

8. Device according to claim 7, comprising gas drain means connected to the space above the pre-determined level.

9. Device according to claim 8, said gas drain means containing filter means.

10. Device according to claim 1, wherein the microbe supporting elements are foamed synthetic grains.

11. Device according to claim 10, wherein the foam cells in the outer part of every grain are open cells.

12. Device according to claim 10, wherein the foam cells in the inner part of every grain are closed cells.

13. Device according to claim 10, wherein the synthetic grains consist of material of the group of polyolefines.

14. Device according to claim 10, wherein the synthetic grains have a diameter in the order of magnitude of 2 centimeters.

15. Device according to claim 1, wherein the reservoir is a standing reservoir.

16. Apparatus for purifying waste water, comprising:
a reservoir with a reservoir fluid level controlling system,
floating microbe support elements with a density of less than 1 supplied to the reservoir, a microbe support element removing system above the reservoir fluid level for removing microbe support elements floating upwardly to the top of the reservoir, a microbe support element cleaning system for cleaning microbe support elements removed by the removing system, and a recycling system for recycling the microbe support elements cleaned in the cleaning system back into a bottom part of the reservoir.

17. Apparatus according to claim 16, further comprising a top tank connected to an upper part of the reservoir through holes below the fluid level in the reservoir, said top tank being connected to a clean water outlet for water cleaned in the reservoir.

18. Apparatus according to claim 17, wherein said reservoir is tapered to form a decreasing cross-section in an upper region of the reservoir to thereby reliably guide the microbe support elements while maintaining them above the reservoir fluid level upstream of a microbe support element conveying device which forms part of the removing system.

19. Apparatus according to claim 17, wherein the fluid level controlling system includes an adjustable standpipe communicated with the top tank.

20. Apparatus according to claim 16, wherein said reservoir is tapered to form a decreasing cross-section in an upper region of the reservoir to thereby reliably guide the microbe support elements while maintaining them above the reservoir fluid level upstream of a microbe support element conveying device which forms part of the removing system.

* * * * *